Sept. 16, 1969     A. K. LEWIS     3,466,786
SPINNING BAITS
Filed July 12, 1967
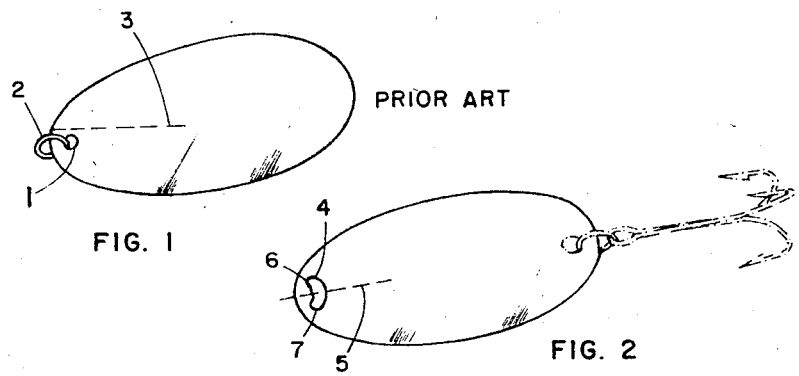
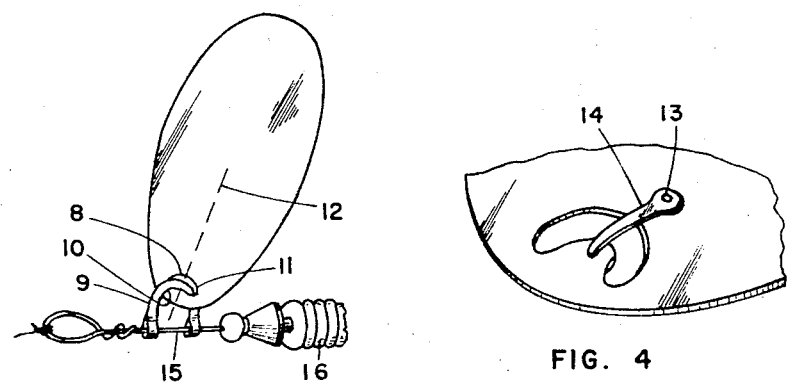
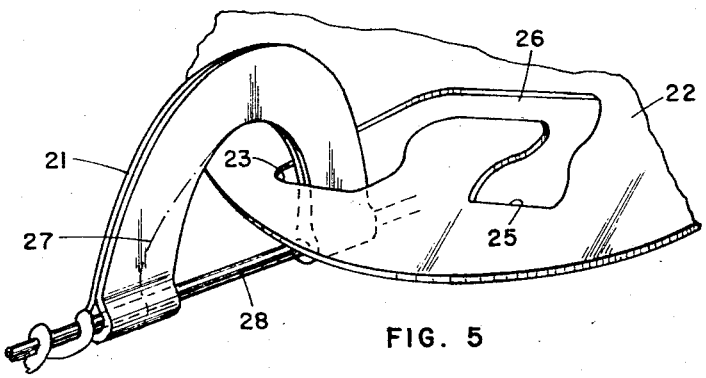
INVENTOR
ALUN K. LEWIS
BY George A. Rolston
ATTORNEY 3,466,786
SPINNING BAITS
Alun Kynric Lewis, Penrallt, Llysfaen,
Glamorganshire, Wales
Filed July 12, 1967, Ser. No. 652,780
Claims priority, application Great Britain, July 14, 1966,
31,767/66
Int. Cl. A01k 91/00, 85/00, 83/00
U.S. Cl. 43—42.17                                        2 Claims

ABSTRACT OF THE DISCLOSURE

A spoon bait for fishing in which means are provided for causing it to selectively rotate clockwise or anti-clockwise. The bait includes a spoon member, having a forwardly facing, substantially crescent shaped hole at the forward end thereof, and a drag link. The hole is symmetrically positioned relative to the Equilibrium Line of the spoon member. The drag link passes through the hole and engages the forward part of the hole in either side of the Equilibrium Line. Means are included to hinder or prevent free movement of the drag link from side to side in the hole.

---

The present invention relates to a bait or lure used in fishing of the kind which rotates when dragged through water and is commonly referred to as a fishing spoon or a spoon bait. Such a bait or lure (hereinafter referred to as a spoon bait) comprises a plate usually made of metal, generally dished in shape which on being drawn through water by a ring or drag link passing through a hole near its periphery, rotates or tends to rotate or spin round an axis passing through or near the point of contact between the spoon and the drag link and extending in the same direction as the tractive force. The rotation or spin is caused by the net effect of the force of the water which impinges against the surfaces of the plate. The form and area of such surfaces are such that a net torque is applied to the plate causing angular movement around the said axis.

The speed, direction and nature of the rotation of the said plate (hereinafter called the spoon member) will depend upon its mass, shape, attachments and mounting relative to the drag link.

In the prior art spoon baits the spoon member is provided with a hole at its forward part and the drag link engages the forward part of such hole to pull the spoon member through the water. Such holes are shaped so that the drag link engages substantially the same part thereof each time the spoon member is pulled through the water. In the majority of cases the holes are substantially circular in shape.

In theory, the point of engagement could lie in such a position on a spoon member that it would refuse to spin or rotate when drawn through the water. This would result from the fact that the net effect of the torque's action on the spoon member in each direction about the said axis is nil, with the result that the spoon member, remains, so far as angular movement is concerned, in a condition of equilibrium.

A line could in theory be drawn from the forward part towards the centre of such a spoon member which would indicate such position or the locus of such a position. To take an example: in the case of a symmetrical egg-shaped spoon member such line would be expected to lie on its maximum diameter.

For the purposes of this specification, such a line shall be referred to hereinafter as the Equilibrium Line of the spoon member.

(It will be appreciated that where the spoon member has a tail attachment, e.g. a triangle hook and/or hair or wool, the Equilibrium Line must be taken to be that of the spoon member together with such attachment when drawn through water. Provision may be made as indicated below for moving laterally, in relation to the main axis of the spoon, such tail attachment where such attachment may have an undesired effect on the location of the Equilibrium Line.)

In the prior art spoon members, the point of engagement between the spoon member and the drag link lies on one side or the other of the Equilibrium Line of the spoon member, and the direction in which the spoon member will rotate depends upon which side of the Equilibrium Line such point of engagement is found.

It is a common experience amongst anglers to find, when fishing with a spinning bait and a light line, that the line used becomes twisted as a result of the spinning of the bait. This can happen despite the use of swivel attachments between the spoon bait and the main body of the line. Such twisting often causes the line to kink and become entangled. When fishing in a river, for example, it is often necessary or desirable to take off the bait so as to take out the twist by allowing the line to be extended by the stream. Alternatively, anti-kink vanes or weights may be employed to lessen the degree of twisting, but these are often found to interfere with the accuracy and the pleasure of casting.

It is an object of the present invention to provide a spoon bait which will not, on repeated use, impart an undesirable degree of twist to the main body of the line.

It is a further object of the present invention to provide a spoon bait which will rotate both in a clockwise and anti-clockwise direction.

It is a further object of the present invention to provide a spoon bait which, in use, will adopt a clockwise or anti-clockwise rotation in a random manner.

It is a further object of the present invention to provide a spoon bait which may be set by the angler to rotate in a clockwise or anti-clockwise direction.

According to the present invention, there is provided a spoon bait comprising a spoon member having at or near its forward end a hole through which passes a drag link the said hole being so shaped that when the spoon member is pulled through water by the drag link, the drag link will engage the forward part of the hole in one or other of two positions situated respectively on one side or the other of the Equilibrium Line of the spoon member as herein defined so that the spoon member is caused to rotate in one or other of a clockwise or anti-clockwise direction respectively.

The hole may advantageously be crescent or U or V shaped, the crescent or U or V shape being so disposed that the horn of the crescent or the tops of the U or V shape respectively are nearest the leading or forward end of the spoon member, and the Equilibrium Line passes between the horns of the crescent or the tops of the U or V shape. The following discussion relates to the use of a spoon member having a crescent shaped hole; but it will be appreciated that the considerations involved apply equally to spoon members having holes or other shapes as indicated above, e.g. U or V shapes.

The drag link may be arranged so as to be freely moveable within the hole when not in use to drag the spoon member. In such a case, when the spoon bait is cast and is thus subjected to the normal degree of loose shaking which accompanies casting and the striking of the water before recovery, the drag link will engage at the apex of one or other of the horns of the crescent. It will be a matter of chance which horn apex will be engaged. Where the crescent is substantially symmetrical in shape and the centre of gravity is symmetrically positioned behind the crescent it will be appreciated that each of the horn apices stands a substantially equal chance of being engaged by the link. In such a case, out of 10 casts and recoveries, say, the angler will find on average that the spoon bait will spin 5 times in a clockwise direction and 5 times in an anti-clockwise direction.

The hole on the spoon member of the present invention may be furnished if desired with means for ensuring that the spoon bait will spin in a predetermined direction on recovery. Thus means may be employed for ensuring that the drag link engages one or other of the horn apices. Thus there may be provided near the base or centre of the crescent a resilient tongue or finger of metal or other suitable resilient material, rivetted or otherwise attached to the spoon member and extending across the crescent shape, which will restrain free movement or the drag link across from one horn of the crescent to another but will allow the angler to push the drag link across manually.

The resilient tongue or finger of metal (which may be made of spring wire) may advantageously extend a short distance beyond the leading edge of the hole. It may also be formed with an enlarged portion e.g. a knob at its free end. This arrangement facilitates the lifting of the resilient member when the drag link is moved from one horn of the crescent to the other.

Alternatively, the drag link may be restrained from movement from one horn to the other by a finger pivotally mounted on the spoon member which may be caused to extend across the crescent shape at its middle and moved out of the way when it is desired to move the drag link from one horn to the other.

Alternatively, the drag link and the hole may be so shaped that the drag link, though free to move from one horn of the crescent to another, will not in practice easily do so of its own accord.

For example, the hole may be of a modified U shape and constituted by two enlarged forward portions joined by a relatively narrow neck. In conjunction with such a hole may be used a drag link which is narrow enough along one side of its cross-section to pass through the neck but too wide along the other side of the cross-section to be turned round within the neck, but which may be turned round in either of the said enlarged portions. In use, the weight of the spoon member will tend to keep the drag link in one or other of the enlarged positions; but transfer of the drag link from the one enlarged position to the other may be effected by the angler. If desired the enlarged portions may be provided at the ends adjacent the neck with shoulders or step shaped parts which will assist in preventing the drag link from entering the neck.

The drag link may be formed at one part with a reduced portion which will enable the link to pass through the reduced neck but which is so positioned that it is generally situated away from the normal point of contact between the drag link and the spoon member. Such reduced portion of the drag link may advantageously be placed at or towards the forward end of the drag link.

The present invention may be applied to conventional spoon baits. Some so-called spoon baits in use at present are modified in that the spoon member is provided with fins, vanes or other means to cause rotation of the bait. It will be appreciated that the spoon members of such baits do not have an Equilibrium Line; and the present invention does not relate to any spoon bait the spoon member whereof is so fashioned as not to have an Equilibrium Line as herein defined running along or through it.

The present invention is particularly useful when applied to spoon baits of the kind which comprise a spoon member mounted on a clevis slideably and rotatably mounted on a shank on which there is also mounted a relatively heavy body member. Spoon baits of this kind have been known for many years and are described for example in United States specification Nos. 1,713,041 and 1,515,849 and in British specification No. 739,671. Part of such a spoon bait is illustrated in FIGURE 3. Since the clevis mounting enables the spoon member freely to rotate around the shank, such baits are often fished without the use of a swivel attachment. However, repeated rotation of the spoon member in one direction often results in practice in appreciable twisting of the line, particularly when fishing in fast streams. The present invention is useful in connection with such a spoon bait where the angler fishing with it wishes to dispense with the use of a swivel.

The invention may be illustrated by reference to the drawing herewith:

FIGURE 1 is a plan view of a conventional spoon bait;

FIGURE 2 is a plan view of a spoon bait according to the present invention;

FIGURES 3, 4, and 5 are enlarged views of portions of spoon baits according to various embodiments; and, FIGURE 6 is an enlarged view of a drag link for a spoon bait according to FIGURE 5 showing a further embodiment.

In FIGURE 1 there is shown a conventional spoon member, where 1 represents the hole used, 2 the drag link and 3 the Equilibrium Line.

FIGURE 2 represents a spoon member according to the present invention. The hole 4 is provided with two forward positions between which the Equilibruim Line 5 passes. The drag link (not shown) may engage the spoon member at the forward end 6 or 7 of one or other of the said forward positions.

FIGURE 3 represents part of a spoon bait comprising a spoon member mounted on a clevis, modified according to the present invention. In this spoon bait, the conventional spoon member has been replaced by a spoon member having a hole substantially the same as that of the spoon member of FIGURE 2. In operation, clevis 9, which constitutes the drag link for this kind of spoon bait, engages the spoon member at point 10 or 11 on either side of the Equilibrium Line 12, thus causing rotation in one direction or the other around the shank 15. The relatively heavy body member 16 serves to exert a stabilizing influence on the shank 15.

In the embodiment of FIGURE 3, it will be seen that the drag link may freely move from one horn of the crescent shaped hole 8 to another. (It will be appreciated that the same would apply in the case of a spoon bait comprising a spoon member as illustrated in FIGURE 2.) The use of normal or deliberate shaking when fishing with the spoon bait will ensure that in the course of several casting and recovering operations, the drag link will inevitably move from one horn to the other thus reducing, eliminating or reversing the twist caused by rotation of the spoon bait during the previous recovery.

In FIGURE 4, the forward part of the spoon member is shown as having means for preventing the movement of the drag link from one horn of the crescent shaped hole to the other. Such means is constituted by a tongue 14 which is attached to the spoon member by mounting means constituted by rivet 13. Such tongue is made of resilient material. If desired, the tongue may be replaced by a finger rotable around its point of attachment and held in the position indicated in the drawing by frictional contact with the spoon member.

In FIGURE 5 is shown part of a drag link constituted by clevis 21 of the kind commonly used on a clevis-mounted spoon bait. The forward part of the spoon member 22 is provided with a modified U-shaped hole having enlarged forward portions 23 and 25 and a relatively narrow connecting neck 26. The relative dimensions of the hole and clevis may be so arranged that by twisting the clevis around manually relative to the spoon member, it may be passed through the narrow neck 26.

Since the breadth of the neck 26 is made substantially smaller that the annular width of the clevis member where it contacts the spoon, passage of the link through the neck by the mere shaking of the spoon bait is inhibited. If desired, the shoulders steps or projections may be provided on the sides of the hole to lessen the chances of the drag link passing through the neck.

According to an alternative construction, the clevis member is formed at its forward end with a reduced portion (as indicated in dotted lines at 27 on FIGURE 5) which will enable the link to pass through the reduced neck upon folding the spoon member over and forward relative to the shank 28 but which will, by reason of the tractive force between the spoon member and the drag link when drawn through the water and the hanging position of the spoon member out of the water, generally be situated away from the spoon member hole.

In an analogous manner, a spoon member of the kind indicated in FIGURE 2 may be modified by the provision of a hole as in FIGURE 5 and a drag link shaped as indicated generally in FIGURE 6. The line attachment to the drag link (which may, for example, be direct or through a swivel) is situated at the reduced part 31 so that the spoon member normally contacts the rear part 32 when dragged through water or suspended from the drag link. Movement of the point of contact between the spoon and the drag link from the one position to the other would be effected by passing the reduced portion of the drag link through the neck portion of the hole.

The present invention has hitherto been described by reference only to the hole at the forward end of the spoon member. The present invention also contemplates a further modification in spoon baits of the kind which have at the rear end of the spoon member an attachment for hooks and/or other material, for example, wires, dyed hair or wool (as indicated in FIGURE 2 for example). The attachment generally consists in the first place of a ring or link passing through the hole at the rear end of the spoon member. Such ring or link will hereinafter be called the tail link.

The foregoing descriptions of various preferred embodiments are given by way of example only.

What I claimed is:

1. A spoon bait comprising a spoon member and a drag link, said spoon member having at or near its forward end a substantially crescent shaped link attaching hole, said hole having the open portion of the crescent shape facing the forward end of the spoon member, said hole also being symmetrically positioned with respect to the Equilibrium Line of the spoon member, and through which passes said drag link, said hole being so shaped that when the spoon member is pulled through water by the drag link, the drag link will engage the forward part of the hole in one or other of two positions situated respectively on one side or the other of the Equilibrium Line of the spoon member as herein defined so that the spoon member is caused to rotate in one or other of a clockwise or anti-clockwise direction respectively; and means to prevent or hinder free movement of the drag link from the one position of its own accord to the other when the spoon bait is shaken.

2. A spoon bait as claimed in claim 1 wherein said preventing means comprises a resilient member adapted to extend across the hole to prevent said free movement of the drag link and the free end of the resilient member extends a short distance beyond the leading edge of the hole.

References Cited

UNITED STATES PATENTS

| | | | |
|---|---|---|---|
| 1,770,003 | 7/1930 | Miller | 43—42.5 |
| 2,925,681 | 2/1960 | Hughes | 43—42.5 |
| 3,077,047 | 2/1963 | Borgstrom | 43—42.17 |
| 3,139,693 | 7/1964 | Newman | 43—42.49 X |

FOREIGN PATENTS 741,531  12/1955  Great Britain.

ALDRICH F. MEDBERY, Primary Examiner

J. H. CZERWONKY, Assistant Examiner

U.S. Cl. X.R.

43—42.18, 42.19, 42.23